June 23, 1953  H. H. HANSEN  2,643,134
OVERLOAD CABLE RELEASE
Filed Jan. 2, 1951
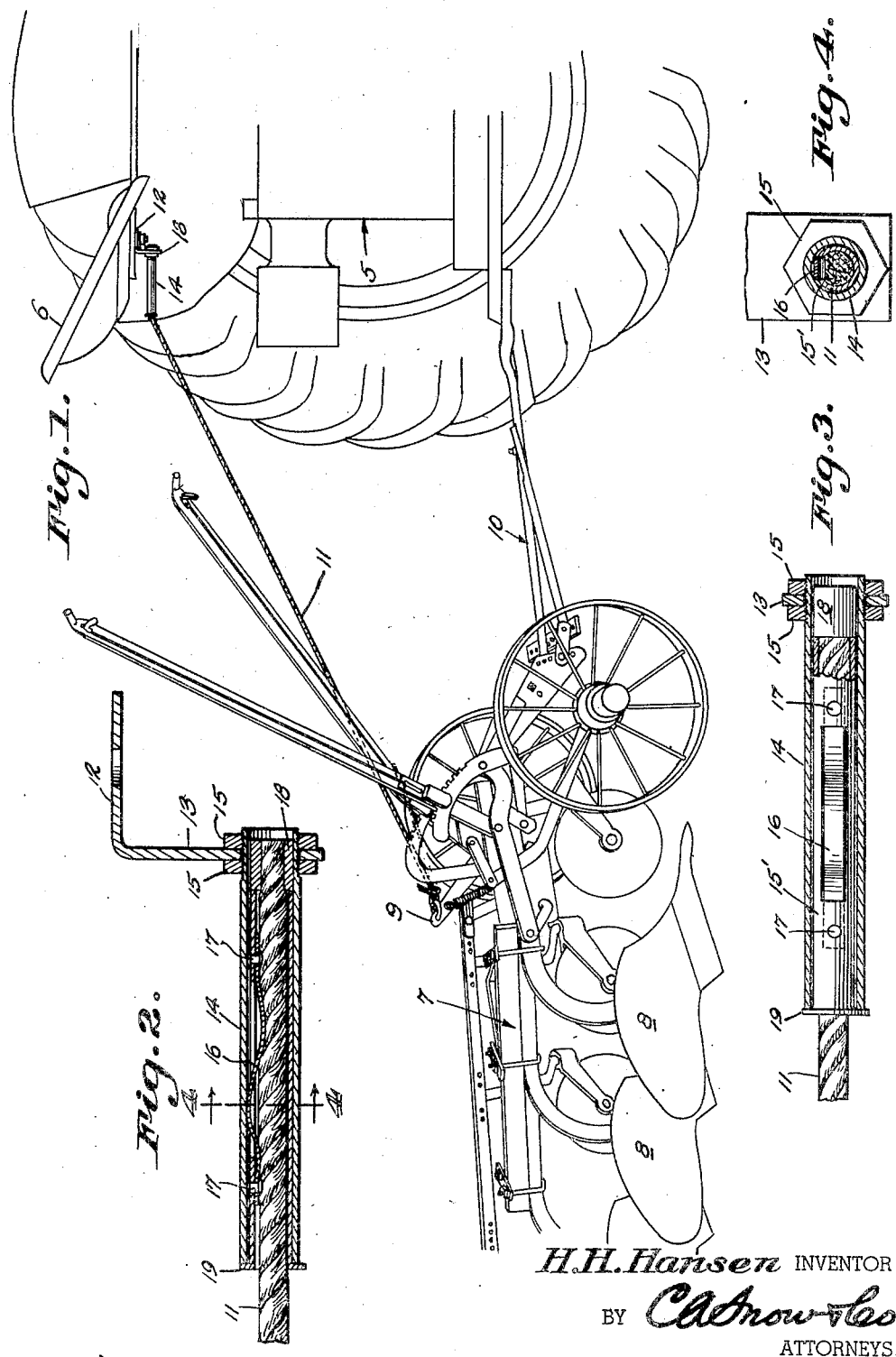
H.H. Hansen INVENTOR,
BY C.A. Snow & Co.
ATTORNEYS.

Patented June 23, 1953

2,643,134

UNITED STATES PATENT OFFICE 2,643,134

OVERLOAD CABLE RELEASE

Harding H. Hansen, Linn Grove, Iowa

Application January 2, 1951, Serial No. 203,977

1 Claim. (Cl. 280—150)

This invention relates to means for automatically releasing the usual clutch-actuating cable or rope of a tractor pulled plow to the end that the plow clutch will be relieved of excessive strain which would otherwise damage and render the plow inoperative, should the plow encounter stationary objects such as rocks, stumps or the like.

An important object of the invention is to provide a device of this character which may be readily and easily secured adjacent to the seat of the tractor, where it will be easily accessible to the operator of the tractor, the device being applied without the necessity of making alterations in the general tractor or plow construction, in order to mount the device.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is a perspective view illustrating a tractor-drawn plow supplied with a cable or rope by means of which the clutch lever or plow lever is raised or lowered.

Fig. 2 is a longitudinal sectional view through the cable attaching device forming the essence of the present invention.

Fig. 3 is a longitudinal sectional view through the attachment.

Fig. 4 is a sectional view taken on line 4—4 of Fig. 2.

Referring to the drawing in detail, the reference character 5 indicates a tractor, and the reference character 6 indicates the tractor seat.

The reference character 7 indicates generally a plow of the gang type, which is provided with plow blades 8 that are raised and lowered, by means of the lever 9 mounted on the frame of the plow. The plow is drawn by the tractor 5, through the hitch bar 10.

The reference character 11 indicates the usual lever or clutch operating cable or rope, which is attached to the lever 9, and usually extends to a point adjacent to the operator's seat, where it is rigidly secured to the tractor. In the present invention, the means for connecting the cable or rope 11 to the tractor is such that it will automatically be disconnected from the tractor, to eliminate any possibility of the plow being damaged, should the plow blades engage a stationary object, such as a deeply embedded rock or stump which would otherwise damage the plow or clutch mechanism in the event that the clutch cable or rope 11 is connected to a clutch lever.

The device comprises the bracket 12 which is bolted to the tractor seat, as shown by Fig. 1, the bracket 12 having a depending arm 13 formed with an opening through which one end of the tubular housing 14 extends, the tubular housing being externally threaded to receive the nuts 15 that clamp the arm 13 therebetween.

The device also includes the tube 15' which is formed with an elongated opening in the side thereof, through which the spring 16 which is of leaf construction, extends, the spring 16 having its ends secured to the wall of the tube 15', by means of rivets 17.

The spring 16 is so constructed and arranged that it will press against the cable or rope 11 which is positioned in the tube 15', the end of the cable or rope 11 being provided with the sleeve 18 which is firmly clamped to the cable or rope 11.

The tube 15' is formed with an annular flange 19 formed on the outer end thereof, which flange provides a stop as it moves against one end of the tubular housing 14. It will be obvious that when the end of the cable or rope 11 is inserted in the tubular housing 14, the spring 16 will bend in a manner as shown by Fig. 2, exerting pressure against the inner surface of the tubular housing 14 to cause the tube 15' with the cable or rope 11, to be held in position within the tubular housing 14, by frictional contact therewith.

Under ordinary conditions, the cable or rope 11 will be held in place within the tubular housing 14, but upon the application of excessive strain or torque on the cable or rope 11, the cable or rope 11 together with the tube 15', will be withdrawn from the tubular housing 14 relieving the lever 9 or clutch controlled thereby of excessive strain which would otherwise tend to damage the plow mechanism, to render the same inoperative.

In the event that the cable or rope 11 should be pulled from the tubular housing 14, the cable may be readily inserted in the tubular housing by forcing the tube 15' into the housing. The replacement of the end of the cable within the tubular housing 14 will take place after the plows have been moved to disengage stationary objects against which they have moved.

Having thus described the invention, what is claimed is:

A device for securing the clutch control cable of an agricultural machine to a tractor, comprising a tubular housing, means for securing the housing to a tractor, a tube having an elongated opening formed in the wall thereof, secured on one end of said cable, a leaf spring secured on said tube with portions thereof extending outwardly and inwardly through said elongated opening, said spring engaging the wall of the housing and cable when fitted in said housing, normally holding said tube in the housing by frictional contact, an annular flange formed on one end of the tube adapted to engage one end of said tubular housing restricting movement of the tube within the housing, and said tube adapted to become disconnected from said housing when abnormal tension is applied to the cable.

HARDING H. HANSEN.

References Cited in the file of this patent

UNITED STATES PATENTS

| Number | Name | Date |
|---|---|---|
| 1,227,446 | Jensen | May 22, 1917 |
| 2,036,953 | Morris | Apr. 7, 1936 |